(12) United States Patent
Sun

(10) Patent No.: US 10,830,984 B2
(45) Date of Patent: Nov. 10, 2020

(54) LENS DRIVING DEVICE, CAMERA DEVICE AND ELECTRONIC APPARATUS

(71) Applicant: New Shicoh Motor Co., Ltd, Zhejiang (CN)

(72) Inventor: Wei Sun, Zhejiang (CN)

(73) Assignee: New Shicoh Motor Co., Ltd., Zhejiang (CN)

( * ) Notice: Subject to any disclaimer, the term of this patent is extended or adjusted under 35 U.S.C. 154(b) by 181 days.

(21) Appl. No.: 16/145,436

(22) Filed: Sep. 28, 2018

(65) Prior Publication Data

US 2019/0107686 A1 Apr. 11, 2019

(51) Int. Cl.
| | |
|---|---|
| *G02B 7/09* | (2006.01) |
| *H02K 41/035* | (2006.01) |
| *G02B 13/00* | (2006.01) |
| *G03B 13/36* | (2006.01) |
| *G02B 7/08* | (2006.01) |

(52) U.S. Cl.
CPC ............... *G02B 7/09* (2013.01); *G02B 7/08* (2013.01); *G02B 13/001* (2013.01); *G03B 13/36* (2013.01); *H02K 41/0356* (2013.01); *G02B 2207/121* (2013.01)

(58) Field of Classification Search
CPC .......... G02B 13/001; G02B 7/04; G02B 7/08; G02B 7/09; G03B 13/36; G03B 2205/0069; G03B 3/10; H02K 41/0356
See application file for complete search history.

(56) References Cited

U.S. PATENT DOCUMENTS

| | | | |
|---|---|---|---|
| 2018/0335601 A1* | 11/2018 | Hu ........................... | G02B 7/04 |
| 2019/0011665 A1* | 1/2019 | Huang .................... | G02B 7/08 |
| 2019/0079263 A1* | 3/2019 | Ho ........................... | G02B 7/08 |

* cited by examiner

*Primary Examiner* — Cara E Rakowski
(74) *Attorney, Agent, or Firm* — Yokoi & Co., U.S.A.; Toshiyuki Yokoi

(57) ABSTRACT

Disclosed are a lens driving device, a camera device and an electronic apparatus. The lens driving device has a stator and a mover moving relative to the stator. The stator has a non-conductive base and a non-conductive housing assembled on the base. The stator is quadrilateral observed from the optical axial direction of the lens. The stator has one of a pair of magnets or a pair of coils disposed respectively on two opposite edges of the quadrilateral. The mover has the other of the pair of magnets or the pair of coils. The pair of coils are respectively opposed to the pair of magnets. The other two opposite edges or the quadrilateral are not provided with the magnets and the coils or a conductive component limning at least one kind of the base, the housing, the magnets or the coils.

22 Claims, 7 Drawing Sheets

LENS DRIVING DEVICE, CAMERA DEVICE AND ELECTRONIC APPARATUS

CROSS-REVERENCE TO RELATED APPLICATIONS

This application claims to Chinese Application No. 201710929885.7 with a filing date of Oct. 9, 2017. The content of the aforementioned applications, including any intervening amendments thereto, are incorporated herein by reference.

TECHNICAL FIELD

The present disclosure relates to a lens driving device, a camera device and an electronic apparatus using same, and the camera device is mounted on a smart phone or the like.

BACKGROUND

In a general type of the conventional lens driving device used in a camera device which is mounted on an electronic apparatus such as a smart phone or the like, a magnet and a coil have been adopted. In this type of lens driving device, coils are wound around a mover for mounting the lens, and a magnet is provided on the stator, to face these coil from the outside. In addition, the yoke iron made of the magnetic metal is provided on the stator, which auctioned as a housing. In Patent Document 1, a shielding cover is further provided outside of the yoke iron.

PRIOR ART DOCUMENTS

Patent Document

Patent Document 1: Japanese Patent Laid-Open No. 2011-199829

SUMMARY

Technical Problems to be Solved

Recently, with the development of smart phones, there has been a situation that an antenna built in a smart phone and a camera device (using a lens driving device) must be arranged close to each other. However, since the housing of the lens driving device is made of metal, which affects the characteristics of the antenna, the antenna and the camera device cannot be arranged so close. The present disclosure has been made to solve the above-mentioned conventional technical problem, and the object of the present disclosure is to provide a lens driving device, a camera device and an electronic apparatus which barely affects the characteristics of die antenna even when the antenna is arranged close thereto.

Means for Solving the Problems

TO achieve the above object, a lens driving device according to the present disclosure is characterized in comprising: a stator having a non-conductive base and a non-conductive housing assembled to the base, where stator is a quadrilateral stator Observed from the optical axial direction of the lens; a mover centrally provided with a lens mounting portion, where the mover moves relative to the stator. One of a pair of magnets or a pair of coils are respectively disposed on two opposite edges of the quadrilateral stator, the mover has the other of the pair of magnets or the pair of coils, the pair of coils are annular observed from outside and are respectively opposed to the pair of magnets, and the other two opposite edges different from the two opposite edges of the quadrilateral stator are not provided with the pair of magnets and the pair of coils or a conductive component forming at least one kind of the base, the housing, the pair of magnets and the pair of coils.

The lens driving device of the present disclosure may also be characterized comprising: a stator and a mover moving relative to the stator, where the stator has a non-conductive base and a non-conductive housing assembled on the base, and the stator is a quadrilateral stator observed from the optical axial direction of the lens, the stator is centrally provided with a lens mounting portion, and the stator has a pair of coils which are annular observed from outside and are disposed respectively on two opposite edges of the quadrilateral stator, the mover has a pair of magnets, and the pair of coils are respectively opposed to the pair of magnets, the other two opposite edges different from the two opposite edges of the quadrilateral stator are not provided with the pair of magnets and the pair of coils or a conductive component forming at least one kind of the base, the housing, the pair of magnets and the pair of coils. With this configuration, a predetermined effect can be achieved.

Beneficial Effect

The present disclosure has a non-conductive base, and a non-conductive housing assembled on the base, where other two opposite edges different from two opposite edges of a quadrilateral stator are not provided with a pair of magnets and a pair of coils or a conductive component forming at least one kind of the base, the housing, the pair of magnets and the pair of coils. If an antenna is provided on one edge of the other, two opposite edges, since the conductive component such as a coil and a magnet that affects the electromagnetic wave can be separated from the antenna, it is possible to achieve the effect that it is difficult to influence the antenna characteristics even if the antenna disposed close to the lens driving device.

Figure 1:
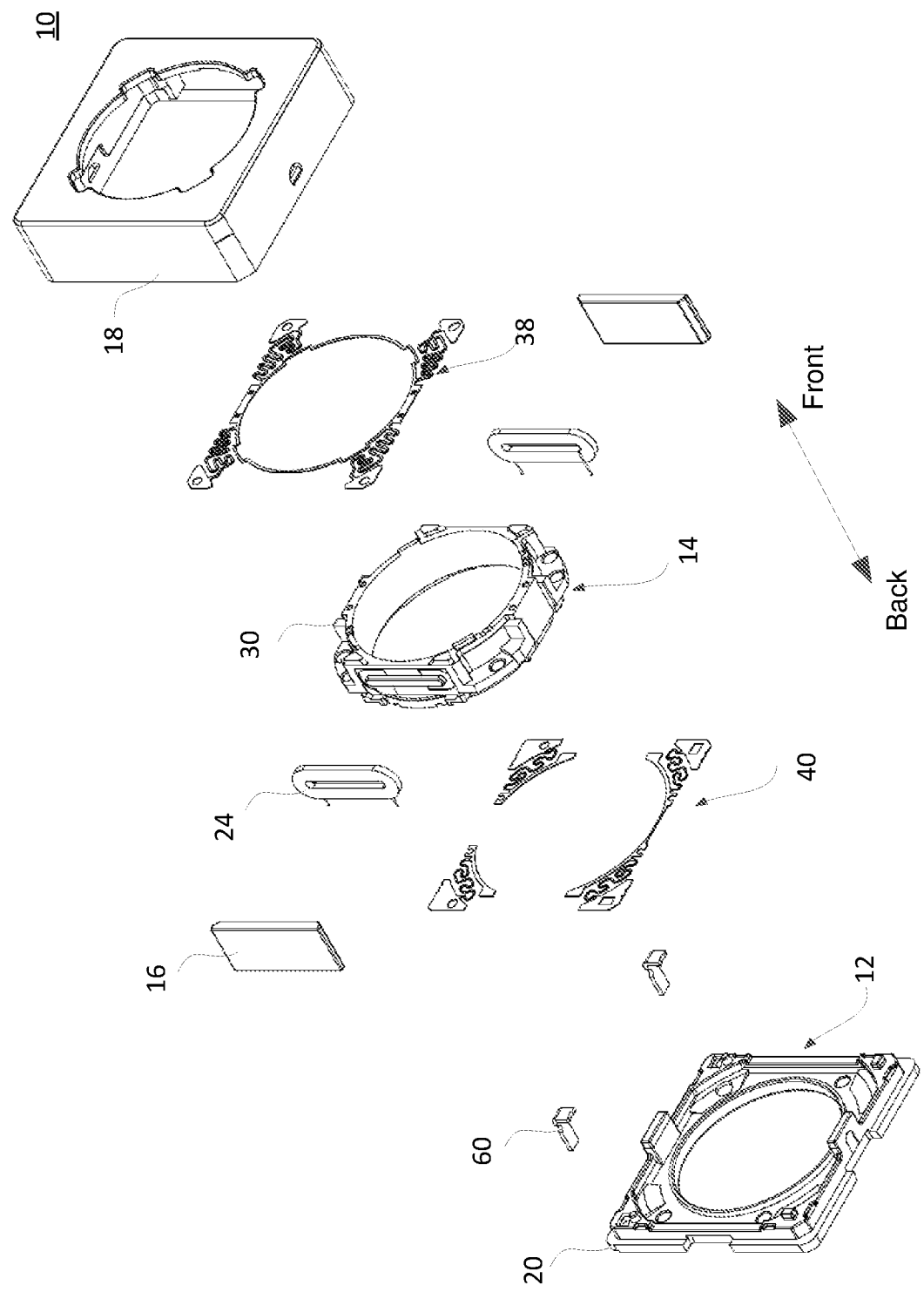
FIG. 1 is an exploded perspective view showing a state of the lens driving device according to the first embodiment of the present disclosure.

The description of the reference numerals is as follows:

10 lens driving device; 12 stator; 14 mover; 16 magnet; 18 housing; 20 base; 24 coil; 122 first through hole; 124 second through hole; 180 locking portion; 182 first end; 184 second end; 186 notch; 201 positioning protrusion; 202 positioning flange; 204 extending portion; 206 recess; 224 coil positioning protrusion; 228 accommodating recess; 30 lens support; 32 lens fixing hole; 40 spring piece; 46 bending portion; 48 stator side fixing portion; 52 arm portion; 56 connecting portion; SS mover side fixing portion; 60 terminal.

DETAILED DESCRIPTION

The present disclosure will be further described below in conjunction with the accompanying drawings and specific operational embodiments.

It should be understood that the specific embodiments described herein are only intended to illustrate the present disclosure, and are not intended to limit the present disclosure.

The present disclosure provides a lens driving device 10. The lens driving device 10 is used in a camera with a built-in auto focus function fir an electronic apparatus such as a smart phone and the like. In the present specification, one direction of optical axial directions of the lens driving device 10 is referred to as a front side, and the other opposite direction is referred to as a rear side as needed. The optical axial direction is the direction in which a straight line between the two arrows in FIG. 1 is located, and the directions of the front side and the rear side are the directions indicated by the arrows in FIG. 1. The light from the subject enters the lens driving device 10 from the front side, and enters an image sensor (not shown) disposed on the rear side through a lens (not shown).

As shown in FIG. 1, in the first embodiment, the lens driving device 10 has a stator 12, a mover 14 moving relative to the stator 12, and a spring piece 40 (also referred to as a rear side spring piece) disposed the stator.

Figure 3:
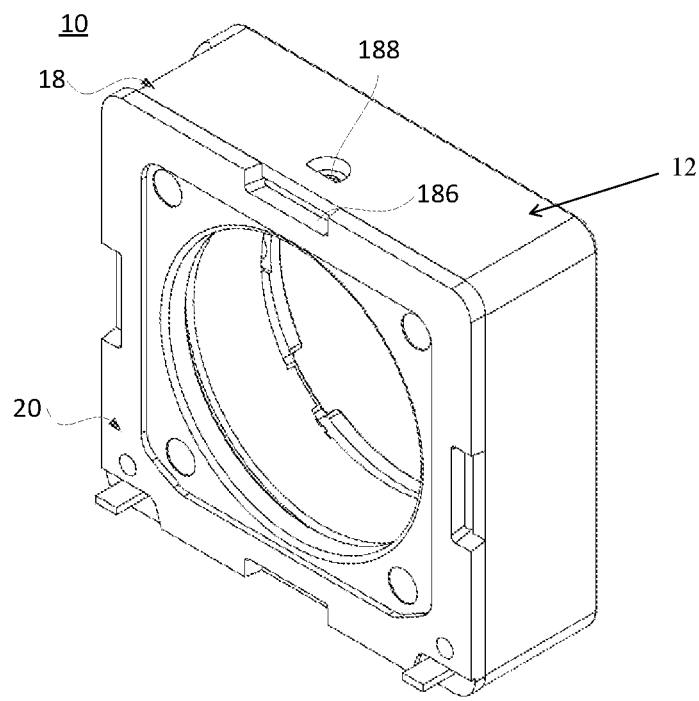
FIG. 3 is a perspective view of the lens driving device according to the first embodiment of the present disclosure as observed from the rear side.

As shown in FIG. 3, the stator 12 has a non-conductive base 20 and a non-conductive housing 18 assembled on the base 20, and the stator 12 is a quadrilateral stator observed from the optical axial directions of the lens. As shown in FIG. 1, two magnets 16 are respectively disposed on two opposite edges of the quadrilateral stator 12. Both the base 20 and the housing 18 are preferably made of plastic.

Figure 2:
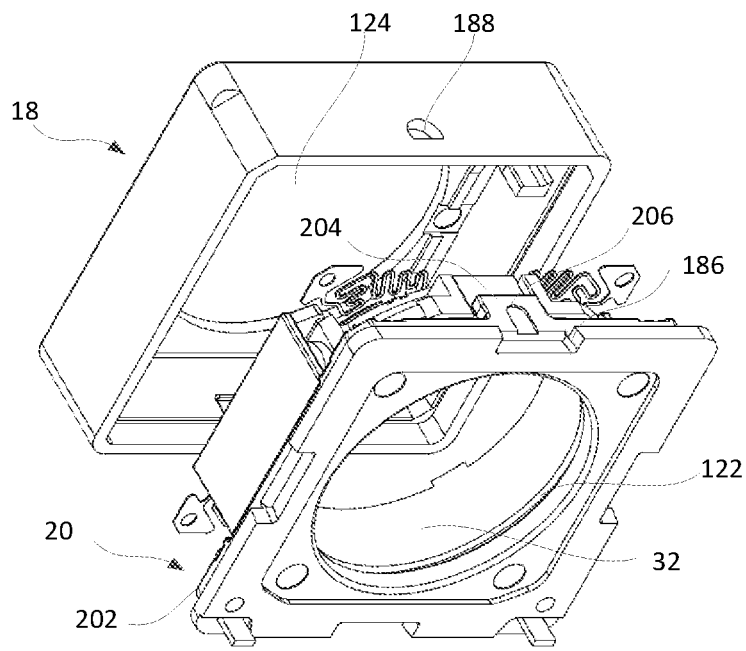
FIG. 2 is an exploded perspective view showing another state of the lens driving device according to the first embodiment of the present disclosure.
Figure 4:
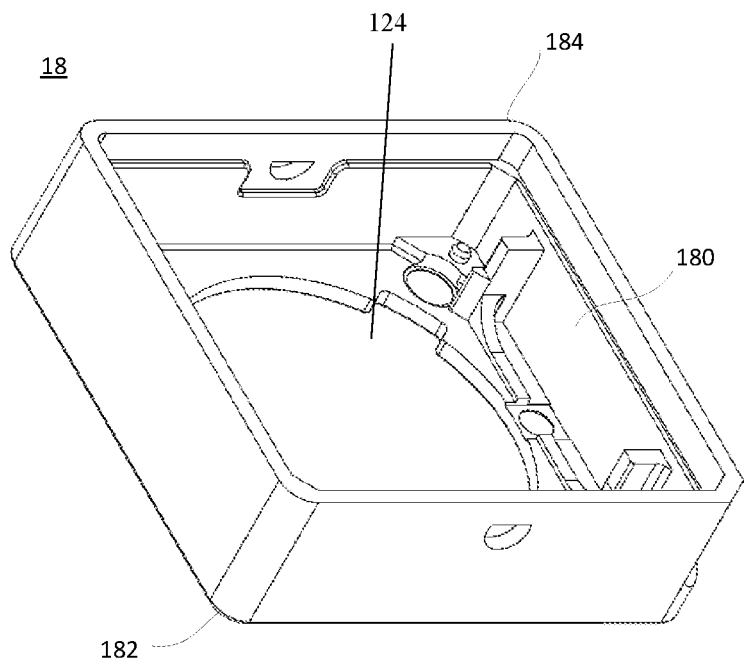
FIG. 4 is a perspective view showing the housing of the lens driving device according to the first embodiment of the present disclosure.

Referring to FIG. 2, FIG. 3 and FIG. 4, the housing 18 and the base 20 are respectively provided with a second through hole 124 and a first through hole 122 for transmitting light along the optical axial direction.

As shown FIG. 4, the housing 18 has a first end 182 of the second through hole 124 and an open second end 184. The housing 18 is hollow inside, and two opposite inner walls of the housing 18 are respectively provided with locking portions 180 which are matched with the pair of magnets 16 in shape and size. The pair of magnets 16 are disposed in the housing 18 and are respectively locked in the locking portions 180.

Figure 8:
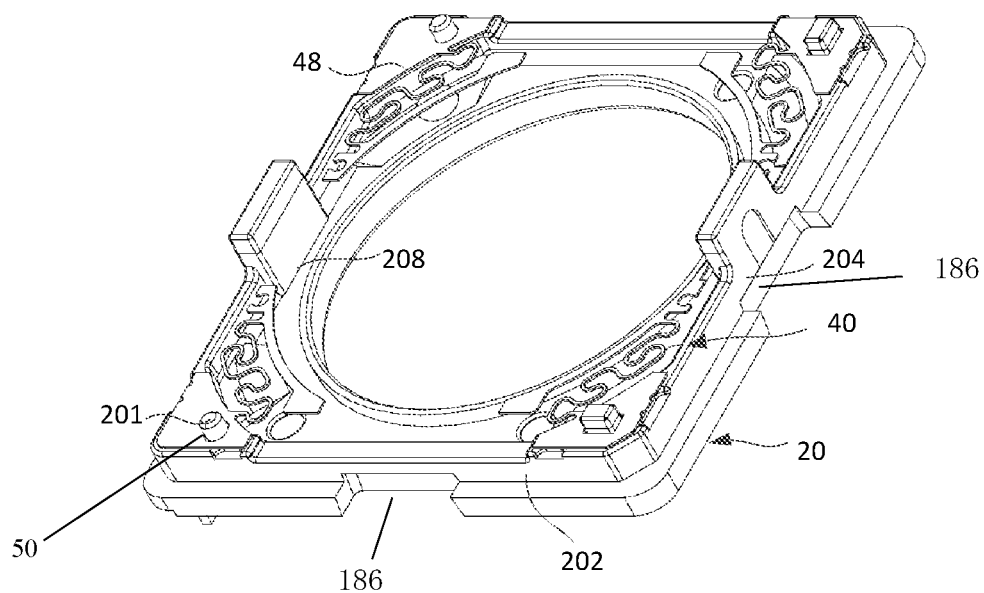
FIG. 8 is a perspective view showing a structure in which the spring piece is mounted on the base of the lens driving device according to the first embodiment of the present disclosure.

As Shown in FIG. 2 and FIG. 8, the base 20 is in a substantially flat shape, and the base 20 is formed with a positioning flange 202 for positioning the housing 18 so as to protrude along the optical axial direction except for the peripheral edge region on the front side in the optical axial direction. The positioning flange 202 is substantially provided around the entire circumferential direction of the base 20. Further, each center of the other two edges without a pair of magnets 16 is provided with an extending portion 204 protruding and extending from the positioning flange 202 toward the front side in the optical axial direction. A rear side surface of the center portion of each edge of the base 20 is provided with a notch 186, and the rear side of the positioning flange 202 is cut off while the notch 186 is opened with a slot on the base 20. An outer side surface of the ex ending portion 204 is provided with a recess 206 having an open end and the notch 186 and the recess 206 communicate with each other.

When the housing 18 and the base 20 are combined, the open second end 184 of the housing 18 is locked on the positioning flange 202 of the base 20, the recess 206 provided on the extending portion 204 is disposed toward the circumferential inner wall of the housing 18, and the notch 186 is located on the outside of the lens driving device 10. Since the edge and the positioning flange 202 of the base 20 are assembled with the open second end 184 and the inner wall of the housing 18 substantially in the entire circumferential direction, such that dust can be prevented from entering into the lens driving device 10 from this position.

Further, after the housing 18 is assembled with the base 20, the adhesive flows in from the notch 186, and the notch 186 serves as an adhesive storing portion. At this time, the recess 206 of the housing 18 and the inner wall of the housing 18 form a gap for the adhesive flowing in from the notch 186. After the base 20 and the recess 206 are integrally assembled, the adhesive flows into the gap through the notch 186, thereby a fixed connection of the base 20 and the housing 18 is achieved.

The recess 206 is not limited to being provided on the base 20. For example, the recess 206 may be formed to be recessed toward at least any one of the base 20 and the housing 18 as long as the adhesive can flow therein. It should also be noted that an adhesive receiving hole 188 is farther provided to the housing 18 at a position corresponding to the recess 206, and the adhesive flowed in the recess 206 further flows into the adhesive receiving hole 188, so that the housing 18 and the base 20 are connected more firmly.

Referring again to FIG. 1 and FIG. 2, the mover 14 is disposed within the stator 12, and a lens fixing hole 32 is centrally provided on the mover 14, and the mover 14 is movable in the optical axial direction with respect to the housing 18. The lens fixing hole 32 is a lens mounting portion.

The mover 14 has a lens support 30 for supporting the lens and a pair of coils 24 being annular observed from the outside. The lens support 30 is in an annular shape, and is centrally provided, with the lens fixing hole 32. The lens support 30 is a non-conductive component, and is preferably made of synthetic resin. Each of the pair of coils 24 is annular observed from the outside, the pair of coils 24 are respectively disposed on two opposite sides of the lens support 30, and the pair of coils 24 respectively correspond to the pair of magnets 16 (see FIG. 9).

It should be noted that the shape of the pair of magnets 16 is a rectangular parallelepiped. When the pair of magnets 15 are disposed opposite to the pair of coils 24, the pair of magnets 16 are preferably capable of covering the plane of the pair of coils 24.

Figure 9:
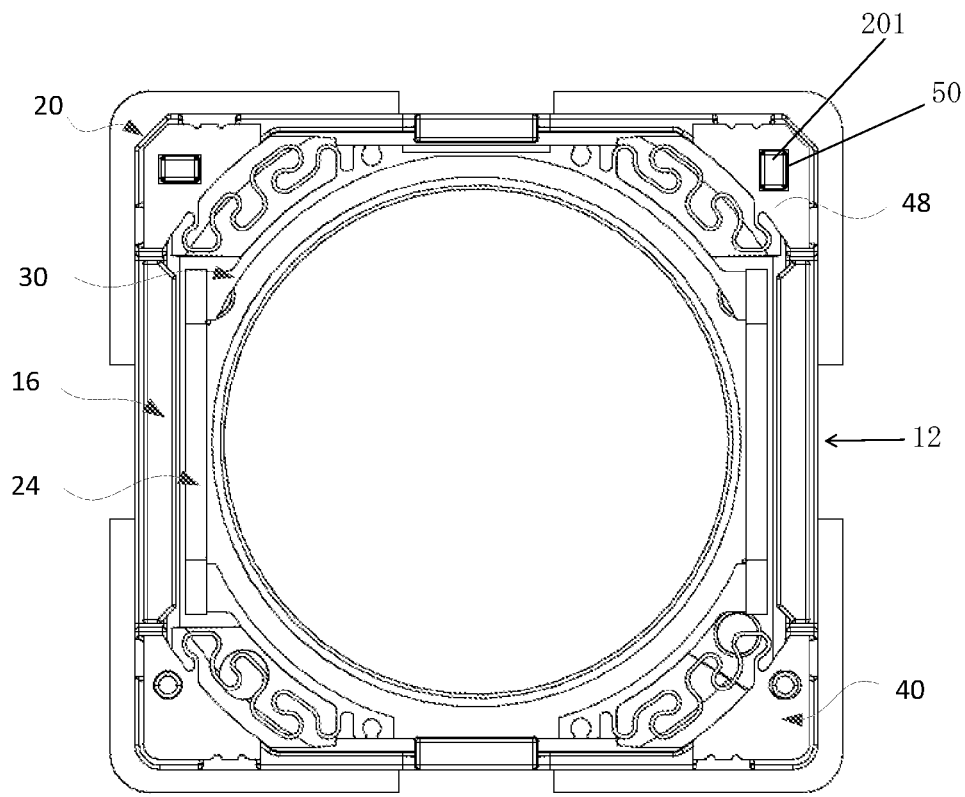
FIG. 9 is a schematic structural view shows a positional relationship among the magnet, the coil, the base and the lens support according to the first embodiment of the present disclosure.

Referring to FIG. 9, in the present embodiment, the other two opposite edges different from the above-mentioned two opposite edges of the quadrilateral stator 12 are not provided with the pair of magnets 16 and the pair of coils 24 or a conductive component, forming at least one kind of the base 20, the housing 18, the pair of magnets 16 or the pair of coils 24. Thus, when an antenna is provided on at least one of the other two opposite edges, conductive components having influence on the electromagnetic wave such as the pair of coils 24 and the pair of magnets 15 can be separated from the antenna, and even if the antenna is disposed close to the lens driving device 10, it is also difficult to affect the effect of the characteristics of the antenna. In the present embodiment, the lens support 30 is also a non-conductive component, so that the influence on the antenna characteristics is further reduced.

Figure 5:
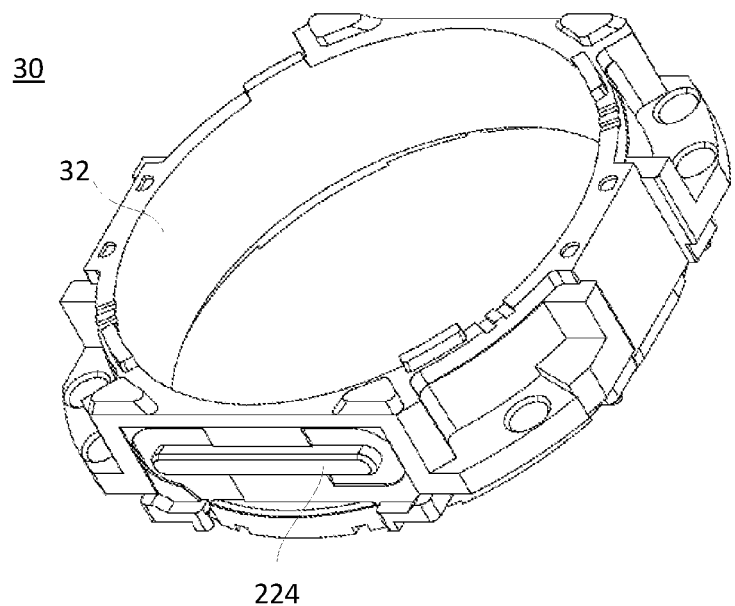
FIG. 5 is a perspective view showing the lens support of the lens driving device according to the first embodiment of the present disclosure.

With respect to the mover 14, as shown in FIG. 5, the outer side of the lens support 30 is substantially quadrilateral observed from the optical axial direction. The lens fixing hole 32 is formed inside the lens support 30 for fixing the lens. The lens fixing hole 32 corresponds to the first through hole 122 and the second through hole 124 of the stator 12 in size. When the mover 14 is disposed in the stator 12, the lens fixing hole 32 is disposed coaxially with the first through hole 122 and the second through hole 124 of the stator 12. Referring again to FIG. 5, each edge of the two opposite edges of the lens support 30 are respectively provided with a coil positioning protrusion 224, and the shape of the coil positioning protrusion 224 corresponds to the shape surrounded by the pair of coils 24. When each of the pair of coils 24 is disposed on the lens support 30, each of the pair of coils 24 surrounds the outside of the coil positioning protrusion 224.

Figure 6:
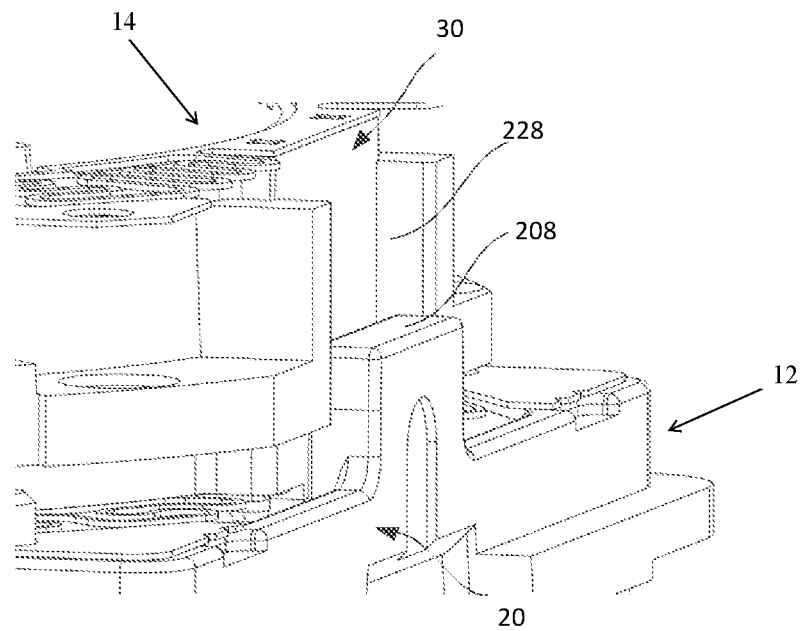
FIG. 6 is a perspective view showing partial structure of the lens support and the base of the lens driving device according to the first embodiment of the present disclosure.

Referring to FIG. 6, the mover 14 is disposed in the stator 12. In order to limit the circumferential rotation of the mover 14 relative to the stator 12, on at least one edge of the other two opposite edges, one of the base 20 and the mover 14 is provided with a protruding portion 208 protruding toward the other, and the other has an accommodating recess 228 for accommodating the protruding portion 208 so as to clamp the protruding portion 208 from the circumferential direction.

In a specific embodiment, the protruding portion 208 protruding from the extending portion 204 to the inner side is provided. The accommodating recess 228 extending along the optical axial direction is disposed on the lens support 30 at a position corresponding to the protruding portion 208. The protruding portion 208 is inserted into the accommodating recess 228 so that two side surfaces of the protruding portion 208 are opposed to two side surfaces of the accommodating recess 228. In this way, the circumferential rotation of the lens support 30 (the mover 14) with respect to the base 20 (the stator 12) can be restricted.

Figure 7:
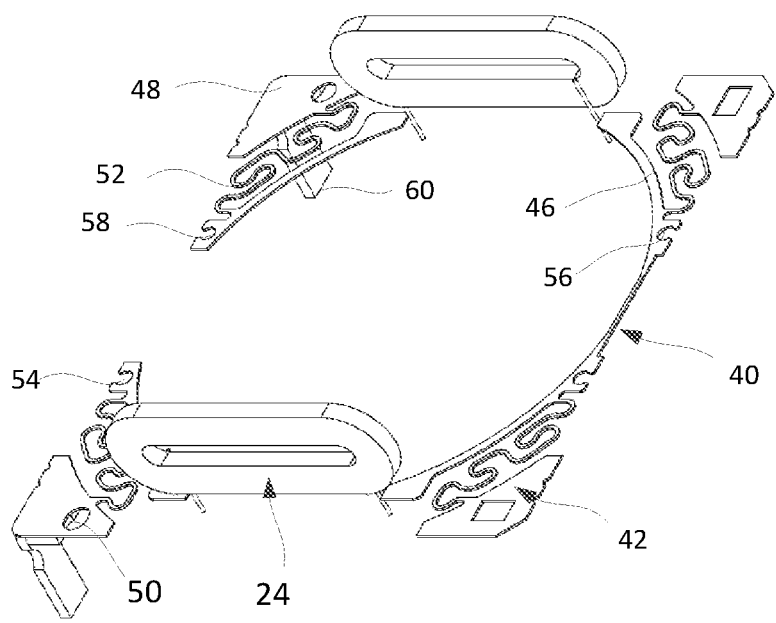
FIG. 7 is a perspective view showing an assembled structure of the spring piece and the coil of the lens driving device according to the first embodiment of the present disclosure.

As shown in FIG. 7, the spring piece 40 has four spring piece connecting units 42. Each of the spring piece connecting units 42 has a stator side fixing portion 48 fixed on the stator 12, a mover side fixing portion 55 fixed on the mover 14, and a arm portion 52 connecting the mover side fixing portion 58 and the stator side fixing portion 48. As shown in FIG. 8, when the spring piece 40 is placed inside the stator 12, four stator side fixing portions 48 are respectively disposed at four enter portions of the quadrilateral stator 12, and are disposed on the surface the stator 12 facing the front of base 20.

The stator side fixing portion 48 is in a triangular shape so as to protrude inward. The arm portion 52 is snake-like and extends toward the adjacent stator side fixing portion 48. The mover side fixing portion 58 has a connecting portion 56 and a bending portion 46 extending from the connecting portion 56 toward the side where the arm portion 52 and the stator side fixing portion 48 of the spring piece connecting unit 42 are connected.

The stator side fixing portion 48 has stator fixing holes 50, and the mover side fixing portion 58 has mover fixing holes 54. The shape of each of the stator fixing holes 50 and the shape of each of the mover fixing holes 54 may be the same or different, and may be a notch-shaped hole or a closed hole. The mover fixing holes 54 are provided on the connecting portion 55 of the mover side fixing portion 58. The mover fixing holes 54 are fitted to a position determining protrusion (not shown) provided on the rear end surface of the lens support 30.

Referring to FIG. 7, a pair of the mover side fixing portions 58 of the two adjacent spring piece connecting units 42 are connected to each other and integrally formed, thereby forming an integrated mover side fixing portion 58. The two connecting portions 56 of the two adjacent and connected spring piece connecting units 42 are disposed adjacent to each other. The two connecting portions 56 of the other two isolated spring piece connecting units 42 are also disposed adjacent to each other.

The pair of coils 24 are electrically connected to each other by the mover side fixing portion 58, respectively. Each of the mover side fixing portions 58 is divided into at least three portions: an integrated mover side fixing portion 58 and other two independent mover side fixing portions 58 provided in isolation. The integrated mover side fixing portion 58 is electrically connected to one end of each of the pair of coils 24, and the two independent mover side fixing portions 58 are electrically connected to the other end of each of the pair of coils 24. The two independent side fixing portions 58 connect the other end of each of the pair of coils 24 to an external power supply through the arm portion 52 and the stator side fixing portion 48, respectively, and further through a terminal 60 to be described later. When the pair of coils 24 and the mover side fixing portion 58 are connected to each other, a lead wire is guided from the pair of coils 24 to electrically connect the pair of coils 24 to the mover side fixing portion 58. With this configuration, the electric current from the external power supply flows from the terminal 60 on one side through the stator side fixing portion 48, the arm portion 52, and the two independent mover side fixing portions 58 on one side into one of the pair of coils 24. Further, the electric current flows from the coil 24 on the one side into the coil 24 on the other side through the integrated mover side fixing portion 58. Further, the electric current flows from the coil 24 on the other side back to the external power supply from the terminal 60 on the other side through the independent mover side fixing portion 58 on the other side, the aim portion 52, and the stator side fixing portion 48. Since the pair of coils 24 and the three portions of the spring piece 40 form an energized circuit, if the pair of coils 24 are energized, an electromagnetic force will be generated between the pair of magnets 16 and the pair of coils 24 to provide power for the movement of the mover 14 relative to the stator 12.

Since the pair of coils 24 are disposed at corresponding positions of two opposite edges of the stator 12, the integrated mover side fixing portion 58 for electrically connecting the pair of coils 24 is disposed on one edge of the other two opposite edges.

As described above, a pair of terminals 60 connected to the external power supply are electrically connected to the stator side fixing portion 48. Each of the pair of terminal 60 is fixed to the base 20 and is disposed on the other edge opposite to one edge provided with the integrated mover side fixing portion 58 in the other two opposite edges.

Referring to FIG. 8 and FIG. 9, the base 20 has positioning protrusions 201 for determining the position of the stator side fixing portion 48 at each corner portion of the quadrilateral. The positioning protrusions 201 are provided in at least two types having different shapes or orientations. On the other hand, the stator fixing holes 50 are also provided in at least two types having different shapes. The positioning protrusions 201 are inserted into the stator fixing holes 50 of the stator side fixing portion 48. In the present embodiment, the stator fixing holes 50 on the stator side fixing portion 48 of the two spring piece connecting units 42 connected to each other are in a square shape. The stator fixing holes 50 on the stator side fixing portion 48 of the two independent spring piece connecting units 42 are in a circular shape. Accordingly, the positioning protrusions 201 corresponding to the stator fixing holes 50 are selected to be square or circular.

By providing the positioning protrusions 201 as at least two types of protrusions having different shapes or orientations, it is possible to prevent the rotation from occurring when the spring piece 40 is assembled.

With continued reference to FIG. 9, when the spring piece 40 is assembled in the stator 12, the pair of magnets 16 are both disposed between the adjacent stator side fixing portions 48 observed from the optical axial direction. Each of the pair of magnets 16 is disposed between the stator side fixing portion 48 of the two spring piece connecting units 42 connected to each other and the stator side fixing portion 48 of the independent spring piece connecting unit 42.

Figure 10:
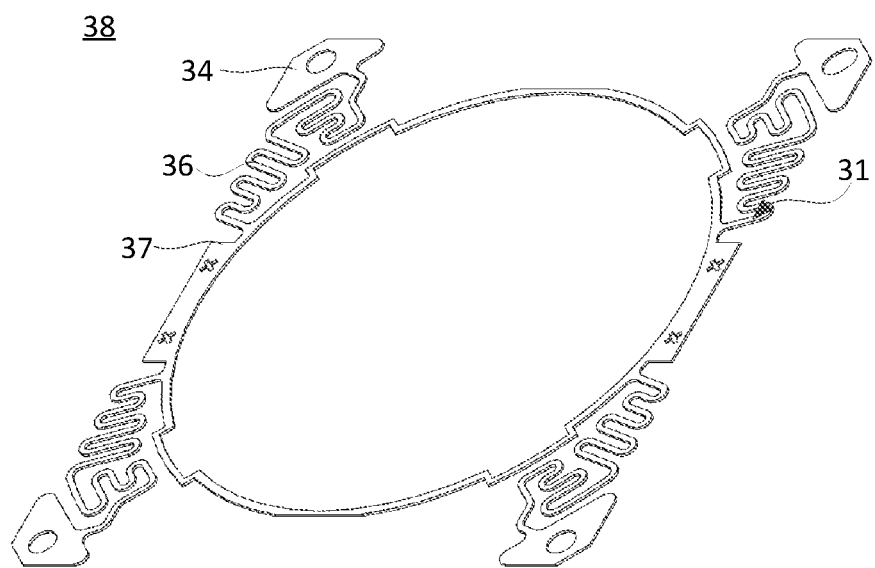
FIG. 10 is a perspective view showing the front side spring piece of the lens driving device according to the first embodiment of the present disclosure.

Referring to FIG. 10, the lens driving device 10 of the present embodiment is further provided with a front side spring piece 38. The front side spring piece 38 has four front side spring piece connecting units 31. Each of the front side spring piece connecting units 31 has a front side stator side fixing portion 34 fixed to the stator 12, a front side mover side fixing portion 37 fixed to the mover 14, and a front side arm portion 36 connecting the front side mover side fixing portion 37 and the front side stator side fixing portion 34. The structure of the front side spring piece connecting units 31 is the same as the structure of the spring piece connecting units 42, and the arrangement manner of the front side spring piece connecting units 31 is substantially the same as the arrangement manner of the spring piece connecting units 42, and will not be described herein.

The front side spring piece 38 and the spring piece 40 are disposed on opposite two sides of the lens support 30, the front side stator side fixing portion 34 and the housing 18 are connected to each other, and the front side mover side fixing portion 37 and the lens support 30 are connected to each other.

In the present embodiment, the front side spring piece 38 and the spring piece 40 are provided, and the font side spring piece 38 bus the front side arm portion 36, the front side stator side fixing portion 34 and the front side mover side fixing portion 37, and the spring piece 40 has the arm portion 52, the stator side fixing portion 48 and the mover side fixing portion 58, thereby the mover 14 can be elastically supported in a manner of being freely movable with respect to the stator 12 in the optical axial direction.

Figure 11:
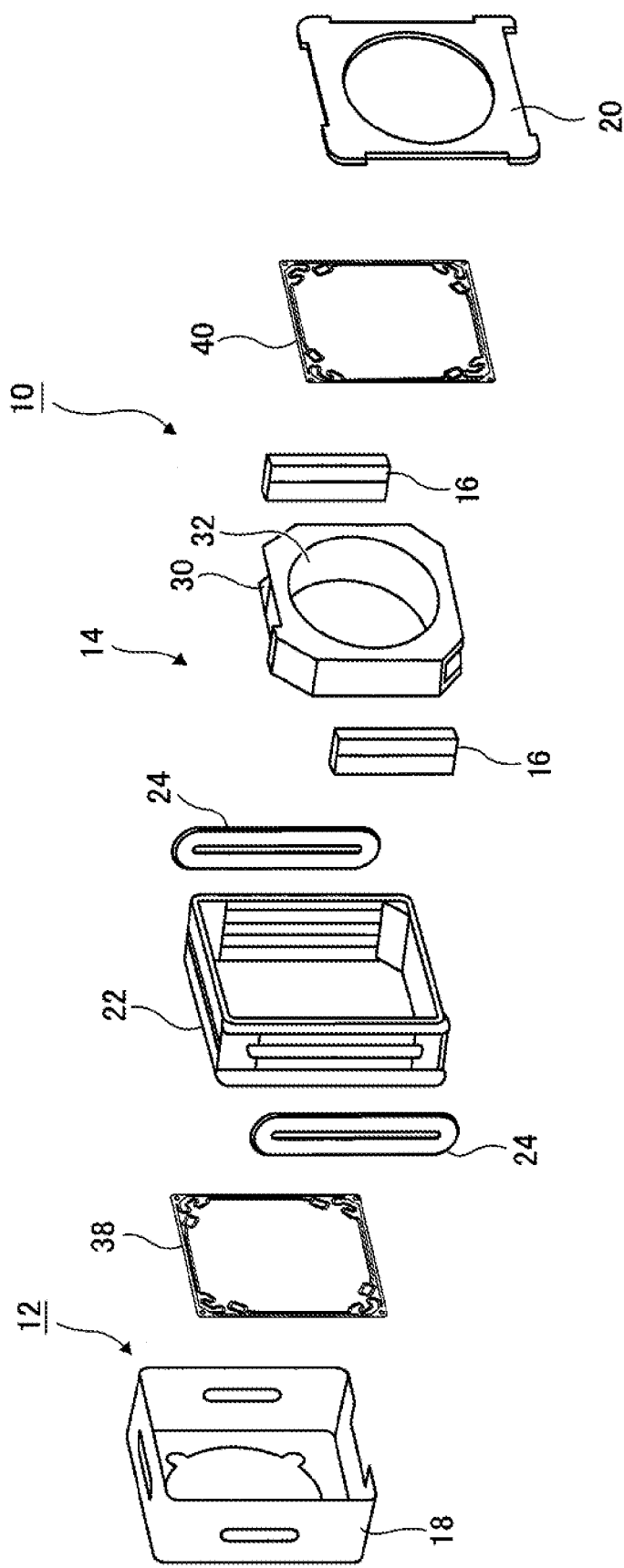
FIG. 11 is an exploded perspective view showing a state of the lens driving device according to the second embodiment of the present disclosure.

Referring to FIG. 11, based on the first embodiment of the present disclosure, a lens driving device 10 of the second embodiment of the present disclosure is provided. In the second embodiment, the lens driving device 10 has a stator 12 and a mover 14 moving relative to the stator 12. The stator 12 has a non-conductive base 20, a non-conductive housing 18 assembled to the base 20, and a non-conductive second housing 22. The stator 12 is a quadrilateral stator observed from the optical axial direction of the lens. The mover 14 is centrally provided with a lens fixing hole 32. The second housing 22 as the stator 12 has a pair of coils 24 which are disposed respectively on two opposite edges of the quadrilateral stator and which are annular observed from the outside. The mover 14 has a non-conductive lens support 30 and a pair of magnets 16. The pair of magnets 16 are disposed on opposite sides of the lens support 30. That is, the difference from the lens driving device 10 of the first embodiment is that the pair of coil 24 are disposed on the stator 12, and the pair of magnet 16 are disposed on the mover 14. The pair of coils 24 are respectively opposed to the pair of magnets 16, and the other two opposite edges different from the opposite two edges of the quadrilateral stator 12 are not provided with the pair of magnets 16 and the pair of coils 24 or a conductive component forming at least one kind of the base 20, the housing 18, the pair of magnets 16 or the pair of coils 24. Further, no conductive component is provided in the lens support 30.

Specifically, since the pair of coils 24 are disposed on the stator 12, the pan of magnets 16 are disposed on the mover 14. Further, the second housing 22 mounted with the pair of coils 24, the spring piece 40, and the front side spring piece 30 is mounted on the base 20, and the lens support 30 mounted with the pair of magnets 16 is disposed in the second housing 22 and is mounted on the base 20 in a manner of covering the entire housing 18. Since the pair of coils 24 are mounted on the stator 12, it is not necessary to perform wiring by the spring piece 40, and therefore, the spring piece 40 is not divided. Therefore, it is necessary to protrude the coil positioning protrusions 224 for fixing the pair of coils 24 on the inner side of the housing 18 and the locking portions 180 for fixing the pair of magnets 16 are provided on opposite sides of the lens support 30. The structure of the coil positioning protrusions 224, the structure of the locking portions 180, the structure of the lens support 30 in this embodiment and other structures of the housing 18, the structures and the assembly relationship of the base 20, each of the pair of coils 24, each of the pair of magnets 16, the spring piece 40 and the front side spring piece 38, etc., are substantially the same as those in the first embodiment, and will not be described again here.

The present disclosure further provides a camera device having lens driving device 10 as described in the first and the second embodiments above. Further, the present disclosure also provides an electronic apparatus having the camera device as described above.

In the present specification, the lens driving device 10 applied to the camera device is described, and the present disclosure is also applicable to other devices.

The above are only preferred embodiments of the present disclosure, and are not intended to limit the scope of the present disclosure. The equivalent structure or equivalent process made by using the specification and the drawings of the present disclosure may be directly or indirectly applied to other related technical fields and may be included in the scope of the protection scope of the present disclosure.

What is claimed is:

1. A lens driving device, comprising:
a stator having a non-conductive base and a non-conductive housing assembled to the base; wherein the stator is a quadrilateral stator when observed from an optical axial direction of the lens;
a mover centrally provided with a lens mounting portion; wherein the mover moves relative to the stator; and
a spring piece;
wherein one of a pair of magnets or a pair of coils are disposed on two opposite edges of the quadrilateral stator, respectively;
the mover has the other of the pair of magnets or the pair of coils; the pair of coils are annular observed from outside and are opposed to the pair of magnets, respectively; and the other two opposite edges different from the two opposite edges of the quadrilateral stator are not provided with the pair of magnets and the pair of coils or a conductive component forming at least one kind of the base, the housing, the pair of magnets or the pair of coils,
the spring piece has stator side fixing portion fixed to the stator, mover side fixing portion fixed to the mover, and arm portion connected with the mover side fixing portion and the stator side fixing portion, and
the pair of coils are electrically connected to each other through the mover side fixing portion, respectively.

2. The lens driving device of claim 1, wherein the mover side fixing portion is disposed on one edge of the other two opposite edges.

3. The lens driving device of claim 2, further comprising a pair of terminals connected to an external power supply; wherein the pair of terminals are both disposed on the other edge of the other two opposite edges.

4. The lens driving device of claim 1, wherein each of the mover side fixing portions is divided into at least three portions; one of the three portions is electrically connected to one end of each of the pair of coils; and other two portions of the three portions electrically connect the other end of each of the pair of coils to the external power supply through the arm portion and the stator side fixing portion, respectively.

5. The lens driving device of claim 1, wherein each of the stator side fixing portions is disposed at a corner portion of the quadrilateral stator; and the pair of magnets are both disposed between two of the stator side fixing portion adjacent to each other observed from the optical axial direction.

6. The lens driving device of claim 1, wherein the base has positioning protrusions for determining a position of each of the stator side fixing portion at each corner portion of the quadrilateral stator; and at least two types of the positioning protrusions having different shapes or orientations are provided.

7. The lens driving device of claim 1, wherein the base and the housing have combining surfaces extending toward the optical axial direction and combined with each other; and each of the combining surfaces has a gap into which an adhesive flows, and a recess connected to the gap; and the recess is recessed toward at least one of the base and the housing; and the adhesive further flows into the recess.

8. The lens driving device of claim 1, wherein the mover has a non-conductive lens support; and the other two opposite edges different from the two opposite edges of the quadrilateral stator are not provided with a conductive component forming the lens support.

9. A camera device, comprising the lens driving device of claim 1.

10. An electronic apparatus, comprising the camera device of claim 9.

11. A lens driving device, comprising:
a stator having a non-conductive base and a non-conductive housing assembled to the base; wherein the stator is a quadrilateral stator when observed from an optical axial direction of the lens; and
a mover centrally provided with a lens mounting portion; wherein the mover moves relative to the stator;
wherein one of a pair of magnets or a pair of coils are disposed on two opposite edges of the quadrilateral stator, respectively;
the mover has the other of the pair of magnets or the pair of coils; the pair of coils are annular observed from outside and are opposed to the pair of magnets, respectively; and the other two opposite edges different from the two opposite edges of the quadrilateral stator are not provided with the pair of magnets and the pair of coils or a conductive component forming at least one kind of the base, the housing, the pair of magnets or the pair of coils, and
on at least one edge of the other two opposite edges, one of the base and the mover is provided with a protruding portion protruding toward the other, and the other has an accommodating recess for accommodating the protruding portion so as to sandwich the protruding portion from the circumferential direction.

12. The lens driving device of claim 11, further comprising a spring piece; wherein the spring piece has stator side fixing portion fixed to the stator, mover side fixing portion fixed to the mover, and arm portion connected with the mover side fixing portion and the stator side fixing portion.

13. The lens driving device of claim 12, wherein the pair of coils are electrically connected to each other through the mover side fixing portion, respectively.

14. The lens driving device of claim 13, wherein the mover side fixing portion is disposed on one edge of the other two opposite edges.

15. The lens driving device of claim 14, further comprising a pair of terminals connected to an external power supply; wherein the pair of terminals are both disposed on the other edge of the other two opposite edges.

16. The lens driving device of claim 13, wherein each of the mover side fixing portions is divided into at least three portions; one of the three portions is electrically connected to one end of each of the pair of coils; and other two portions of the three portions electrically connect the other end of each of the pair of coils to the external power supply through the arm portion and the stator side fixing portion, respectively.

17. The lens driving device of claim 12, wherein each of the stator side fixing portions is disposed at a corner portion of the quadrilateral stator; and the pair of magnets are both disposed between two of the stator side fixing portion adjacent to each other observed from the optical axial direction.

18. The lens driving device of claim 12, wherein the base has positioning protrusions for determining a position of each of the stator side fixing portion at each corner portion of the quadrilateral stator; and at least two types of the positioning protrusions having different shapes or orientations are provided.

19. The lens driving device of claim 11, wherein the base and the housing have combining surfaces extending toward the optical axial direction and combined with each other;

and each of the combining surfaces has a gap into which an adhesive flows, and a recess connected to the gap; and the recess is recessed toward at least one of the base and the housing; and the adhesive further flows into the recess.

20. The lens driving device of claim 11, wherein the mover has a non-conductive lens support; and the other two opposite edges different from the two opposite edges of the quadrilateral stator are not provided with a conductive component forming the lens support.

21. A camera device, comprising the lens driving device of claim 11.

22. An electronic apparatus, comprising the camera device of claim 21.

\* \* \* \* \*